(12) United States Patent
Haseltine et al.

(10) Patent No.: US 9,927,235 B2
(45) Date of Patent: Mar. 27, 2018

(54) INTERACTIVE TURRET ROBOT

(71) Applicant: Disney Enterprises, Inc., Burbank, CA (US)

(72) Inventors: Eric C. Haseltine, Silver Spring, MD (US); Michael P. Goslin, Sherman Oaks, CA (US); Joseph L. Olson, Los Angeles, CA (US); Katherine M. Bassett, Burbank, CA (US); Frederick A. Stillman, Seattle, WA (US); James K. Stobar, Los Angeles, CA (US); JoAnn McLaughlin, Edison, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 764 days.

(21) Appl. No.: 14/560,984

(22) Filed: Dec. 4, 2014

(65) Prior Publication Data

US 2015/0151208 A1    Jun. 4, 2015

Related U.S. Application Data

(60) Provisional application No. 61/911,907, filed on Dec. 4, 2013.

(51) Int. Cl.
| | |
|---|---|
| *G05B 19/04* | (2006.01) |
| *G01C 3/08* | (2006.01) |
| *A63H 30/04* | (2006.01) |
| *A63H 33/00* | (2006.01) |

(52) U.S. Cl.
CPC .............. *G01C 3/08* (2013.01); *A63H 30/04* (2013.01); *A63H 33/005* (2013.01)

(58) Field of Classification Search
CPC .......... G01C 3/08; A63H 33/005; A63H 30/04
See application file for complete search history.

(56) References Cited

U.S. PATENT DOCUMENTS

| | | | |
|---|---|---|---|
| 2004/0103510 A1* | 6/2004 | Sauter | B23Q 39/02 29/26 A |
| 2005/0186889 A1* | 8/2005 | McNeil | B24B 31/003 451/36 |
| 2014/0146309 A1* | 5/2014 | Burke | G01B 11/002 356/72 |
| 2017/0268851 A1* | 9/2017 | Hamilton | F41G 1/38 |

* cited by examiner

*Primary Examiner* — Ian Jen
(74) *Attorney, Agent, or Firm* — Patterson + Sheridan, LLP

(57) ABSTRACT

One embodiment provides an apparatus that includes a plurality of wheels configured to rotate in either of two rotational directions about an axis of rotation. The apparatus further includes a turret portion disposed between the two wheels and rotatable about the axis of rotation in either of the two rotational directions and independently of the plurality of wheels. Additionally, the apparatus includes a motor configured to provide torque to the plurality of wheels and the turret portion. The motor can cause each of the plurality of wheels to rotate independently in either of the two rotational directions when operating in a first rotational speed mode. The motor can also cause the turret portion to rotate in either of the two rotational directions independently of the plurality of wheels when operating in a second rotational speed mode which is faster relative to the first rotational speed mode.

20 Claims, 9 Drawing Sheets

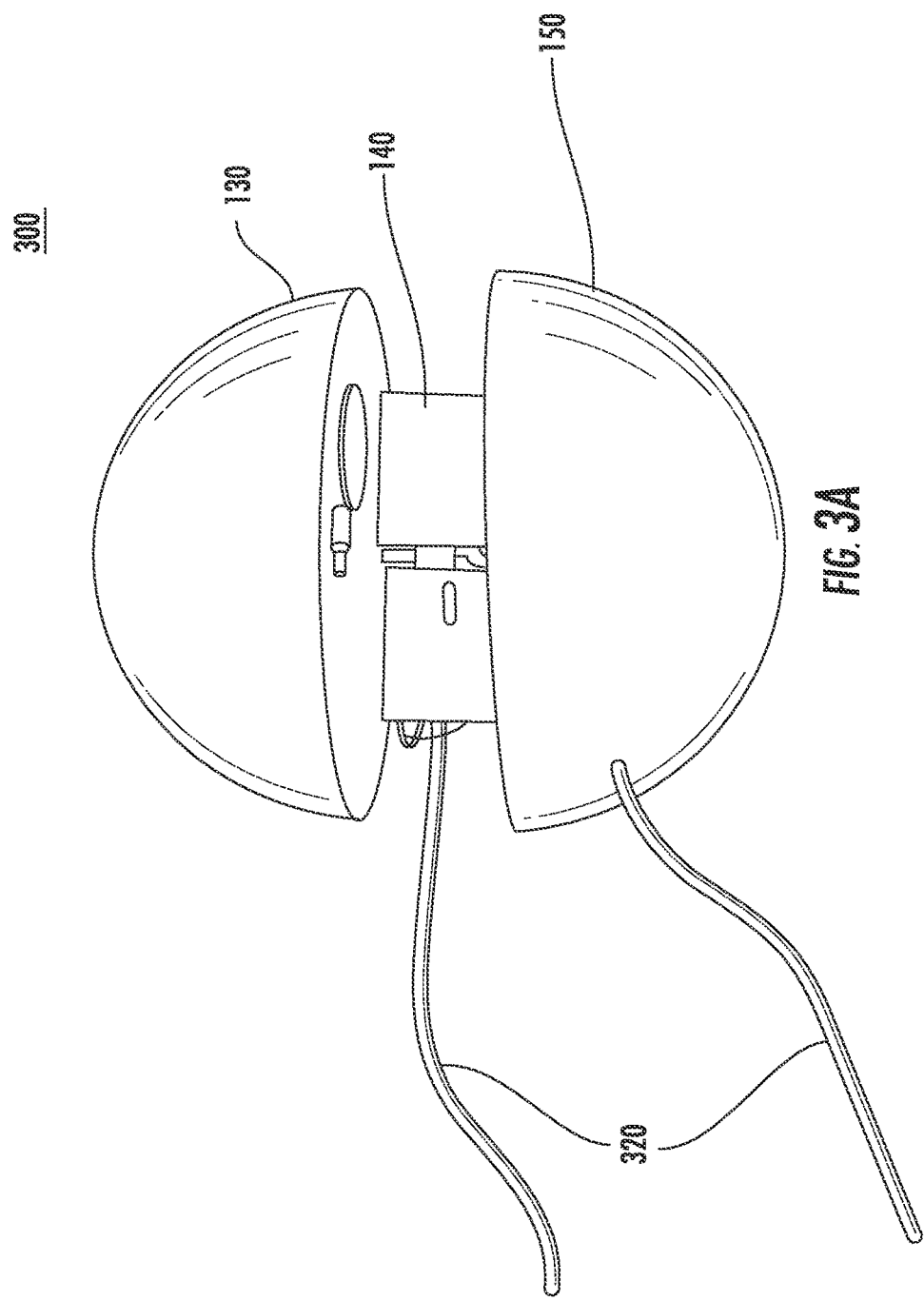

INTERACTIVE TURRET ROBOT

CROSS-REFERENCE TO RELATED APPLICATIONS

This application claims benefit of U.S. provisional patent application Ser. No. 61/911,907, filed Dec. 4, 2013, which is herein incorporated by reference in its entirety.

BACKGROUND

Field of the Invention

The present invention generally relates to home entertainment, and more specifically to techniques for providing an immersive playtime environment using interactive devices that include an interactive turret bot.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 3A-B illustrates an interactive turret robot configured with a weed whacker accessory, according to embodiments described herein.

DETAILED DESCRIPTION

Embodiments generally provide a turret-equipped robot for use in providing an interactive play experience for a user. Such a robot may include two or more wheels and at least one motor to drive the wheels. The wheels may be capable of turning in either direction. In one embodiment, each wheel of the robot is capable of turning individually. Thus, one wheel could remain stationary while another wheel turns, or each wheel count turn in an opposite direction, causing the robot to spin in place.

Additionally, the robot may include an inner turret portion to which the at least one motor can be attached. The motor can be a variable speed, bi-direction motor. By attaching the motor to the inner turret portion, the robot can be configured to rotate the inner turret portion instead of the wheels in certain situations. For instance, when the motor operates in a low rotations per minute (RPM) mode, the motor can have sufficient power to drive the wheels of the robot, thus causing the robot to roll forward or background on the ground. However, when the motor operates at a higher number of RPM, the motor may lack the power to drive the wheels of the robot. However, in such a situation, the motor could still have the power to drive the inner turret portion, thus causing the inner turret portion to spin rapidly while the wheels remain stationary. This behavior, also called a "berserk" mode, causes the robot to dramatically wobble around and may cause the robot to bump into other toys or to dislodge any object resting on of the robot.

Figure 1:
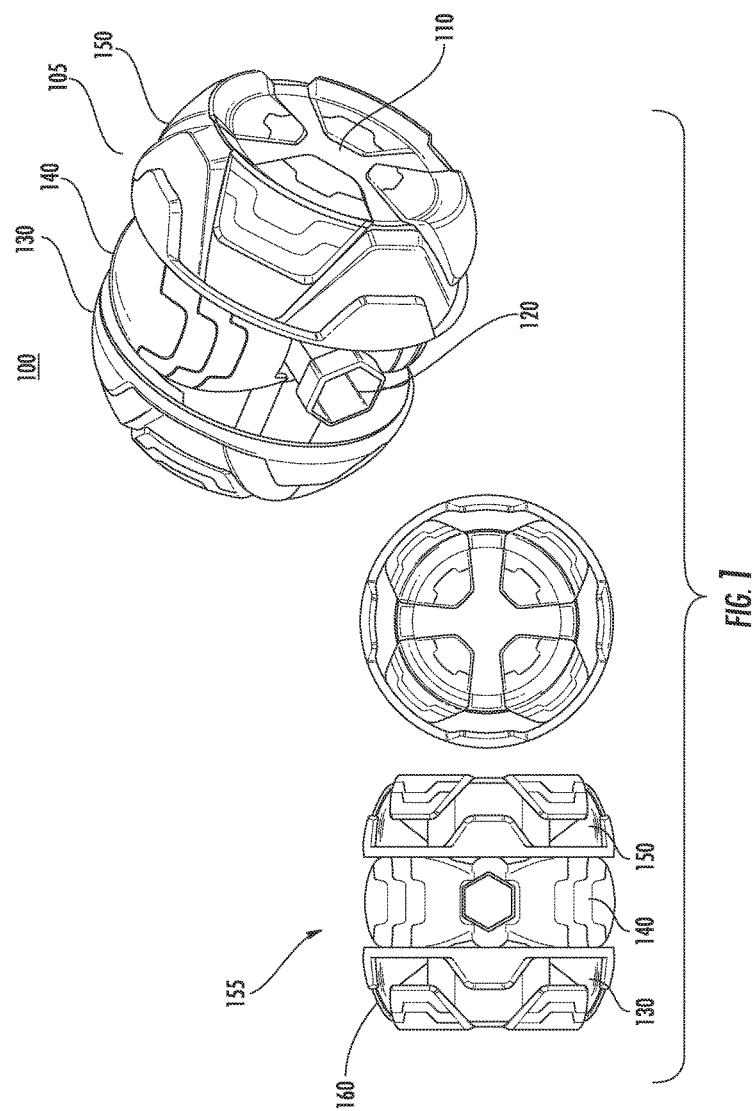
FIG. 1 illustrates several views of an interactive turret robot, according to one embodiment described herein.

FIG. 1 illustrates several views of such an interactive turret robot, according to one embodiment described herein. As shown, the diagram 100 includes a first view 105 having two wheels 130, 150 and an inner turret portion 140. When the interactive turret robot travels about the physical environment, the inner turret portion 140 can generally rotate at a different rotational speed relative to the wheels 130 and 150. Several techniques can be used to provide the difference in rotational speeds. For example, an uneven distribution of weight may be disposed within the inner turret portion 140. As another example, the device could include a protrusion extending from the center portion to contact the ground, which could slow or even prevent rotation of the inner turret portion 140 while the interactive turret robot is resting on both of the two wheels 130 and 150. As still another example, a motor could be provided within the inner turret portion 140 that spins an uneven weight in an opposite rotational direction relative to the wheels 130 and 150, thereby providing a different rotational speed of the inner turret portion 140 relative to the wheels 130 and 150.

The inner turret portion 140 includes an infrared blaster 120, which can include an infrared transmitter or transceiver capable of emitting infrared signals in the direction the blaster 120 is facing. Additionally, each of the wheels 130, 150 includes a flat edge surface 110 (here, only the flat surface 110 for the wheel 150 is shown). The flat edge surface 110 allows the robot to enter a "turret mode", in which the robot sits upright on one of the flat surfaces 110. In such a "turret mode", the bi-directional motor within the robot may lack the power to drive the wheel on which the robot is resting. Thus, when the motor is engaged, the inner turret portion 140 of the robot may rotate instead of the wheels 130, 150. Such behavior can be used, for instance, to aim the blaster 120 in a desired direction.

In one embodiment, device could include a respective motor coupled between the inner turret portion 140 and each of the two wheels 130 and 150. Generally, each of the motors in such an embodiment is configured to rotate the respective wheel 130 and 150 to move the device about the physical environment. Moreover, when the device is in "turret mode" (i.e., when the device sits upright on one of the flat surfaces 110), one of the motors could be engaged in order to rotate the inner turret portion 140. For example, the motor coupled to the wheel which is in contact to the surface on which the device is resting could be engaged to cause the inner turret portion 140 to rotate.

A second view 155 of the robot is also shown in the diagram 100. Here, the flat end surfaces of the wheels 130, 150 can clearly be seen. Additionally, the wheels are semi-rounded in shape, as shown by rounded edge 160. Doing so allows the turret robot to gracefully handle collisions with surfaces and other devices. For instance, when the turret robot collides with a wall at an angle, the rounded edge 160 can cause the turret robot to roll off of the wall and to shift directions away from the wall, as opposed to simply colliding with the wall and coming to a hard stop.

Figure 2:
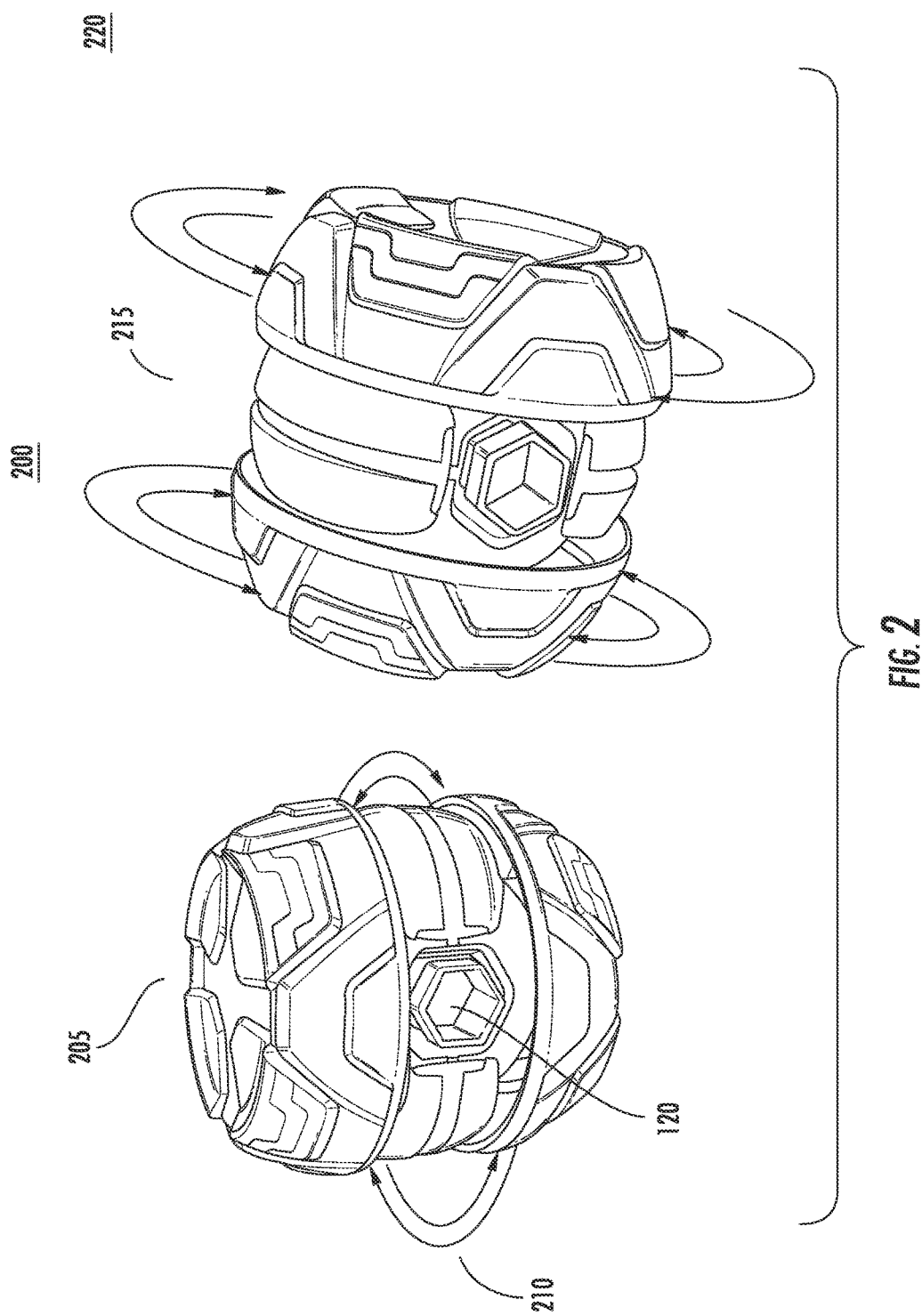
FIG. 2 illustrates movement characteristics of an interactive turret robot, according to one embodiment described herein.

FIG. 2 illustrates movement characteristics of an interactive turret robot, according to one embodiment described herein. As shown, the diagram 200 includes a first view 205 of the robot sitting upright on a flat end surface of one of the wheels (i.e., in the aforementioned "turret mode"). Here, the motor within the robot can be engaged to rotate the inner turret portion of the robot, thus rotating the infrared blaster 120. For instance, the infrared blaster 120 could be rotated until the blaster 120 faces a desired target (e.g., another interactive device), such that an infrared signal can be transmitted in the direction of the desired target. This rotation is shown in the diagram 200 by the directional lines 210.

An alternate view 215 of the turret robot is also shown, in which the robot is resting upon its wheels. Here, the motor may be engaged in a low RPM mode (i.e., a mode in which the motor has sufficient power to rotate the wheels) in order to cause the robot to roll backwards or forwards, or to cause the robot to rotate in place (e.g., by rotating the wheels in opposite directions). This rotation of the wheels is shown in the diagram 200 by the directional lines 220. Additionally, the motor can be engaged in a high RPM mode (i.e., a mode in which the motor lacks sufficient power to rotate the wheels), thus causing the inner turret portion of the robot to rotate instead of the wheels. This "berserk mode" can cause the robot to wobble erratically. In one embodiment, this wobbling effect can be used to transition the robot from the upright position shown in view 205 to the floor position shown in view 215, or could be used to transition the robot from the floor position shown in view 215 to the upright position 205. In such an embodiment, the robot (or remote control logic for the robot) could be configured to rotate the inner portion until a state change is detected (e.g., a transition from the position of view 205 to the position of view 215, or vice versa). For example, and without limitation, the device could be configured with a tiltmeter (e.g., a nano-technology-based tiltmeter, a fluid-based device, a mechanical or electromechanical tiltmeter, etc.) configured to detect when the robot has changed states. More generally, any sensor or device capable of detecting when the robot changes state can be used, consistent with the functionality disclosed herein.

Figure 3B:
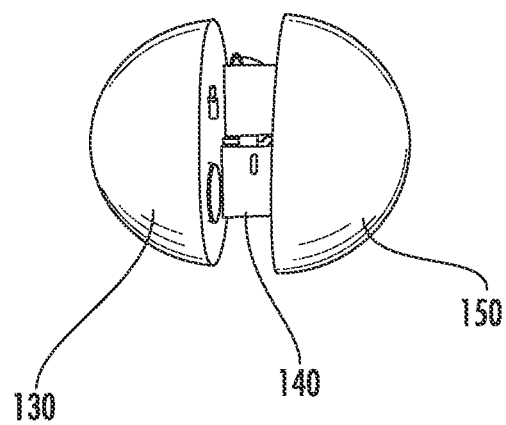

FIGS. 3A-B illustrates an interactive turret robot configured with a weed whacker accessory, according to embodiments described herein. As shown, the diagram 300 in FIG. 3A includes an interactive turret robot having wheels 130, 150 and an inner turret portion 140. Additionally, the depicted robot is also configured with tentacle attachments 320, allowing the robot to enter a "weed whacker" mode. As shown, one of the tentacle attachments 320 is attached to the inner turret portion of the robot, while a second tentacle attachment 320 is attached to a wheel 150 of the robot. More generally, however, interactive turret robots can be configured with any number of tentacle attachments 320 attached to any surface(s) of the robot.

Here, the tentacle attachments 320 can be used to physically interact with other interactive devices within the physical environment. For instance, the robot could deploy the tentacle attachments 320, such that the tentacle attachments 320 spin much like the string of a weed whacker when the motor is engaged. As an example, an action figure interactive device could be deployed in an upright/standing position within the physical environment, and the turret robot could enter "turret mode" (i.e., the upright position shown above in view 205) in close proximity to the action figure device. The robot could then deploy a tentacle attachment 320 attached to the inner turret portion 140 of the robot and could engage the motor, causing the inner turret portion 140 to spin rapidly. This in turn could cause the tentacle attachment 320 to spin into the action figure device, physically knocking the action figure device over. Doing so allows the robot to physically interact with other interactive devices.

In one embodiment, the tentacle attachments 320 can be deployed and retracted on command. An example of this is shown in FIG. 3B, where the illustration 320 depicts the robot having wheels 130, 150 and the inner turret portion 140. Here, the tentacle attachments 320 shown in FIG. 3A have been retracted (e.g., using an additional motor(s) to wind each tentacle attachment around a respective spindle within the robot), and can be deployed upon command. For instance, the robot (or remote logic controlling the robot) could be configured to retract the tentacle attachments 320 when the robot is in a movement or floor mode (i.e., the position shown in view 215), and could be configured to deploy the tentacle attachments 320 when the robot enters "turret mode" (i.e., the position shown in view 205).

Additionally, the turret robot can be configured to determine a direction of another interactive device relative to the robot through the use of two or more microphones within the robot. Such a determination could then be used, for instance, to aim the infrared blaster 120 towards the other interactive device. The turret robot can also be configured to determine a distance between the robot and another interactive device through the use of infrared and ultrasound devices on the robot and the other interactive device. Such a distance calculation could then be used, for example, to direct the movement of the robot (e.g., engaging the motor to move the robot in order to stay within a particular distance of the other interactive device).

Figure 4:
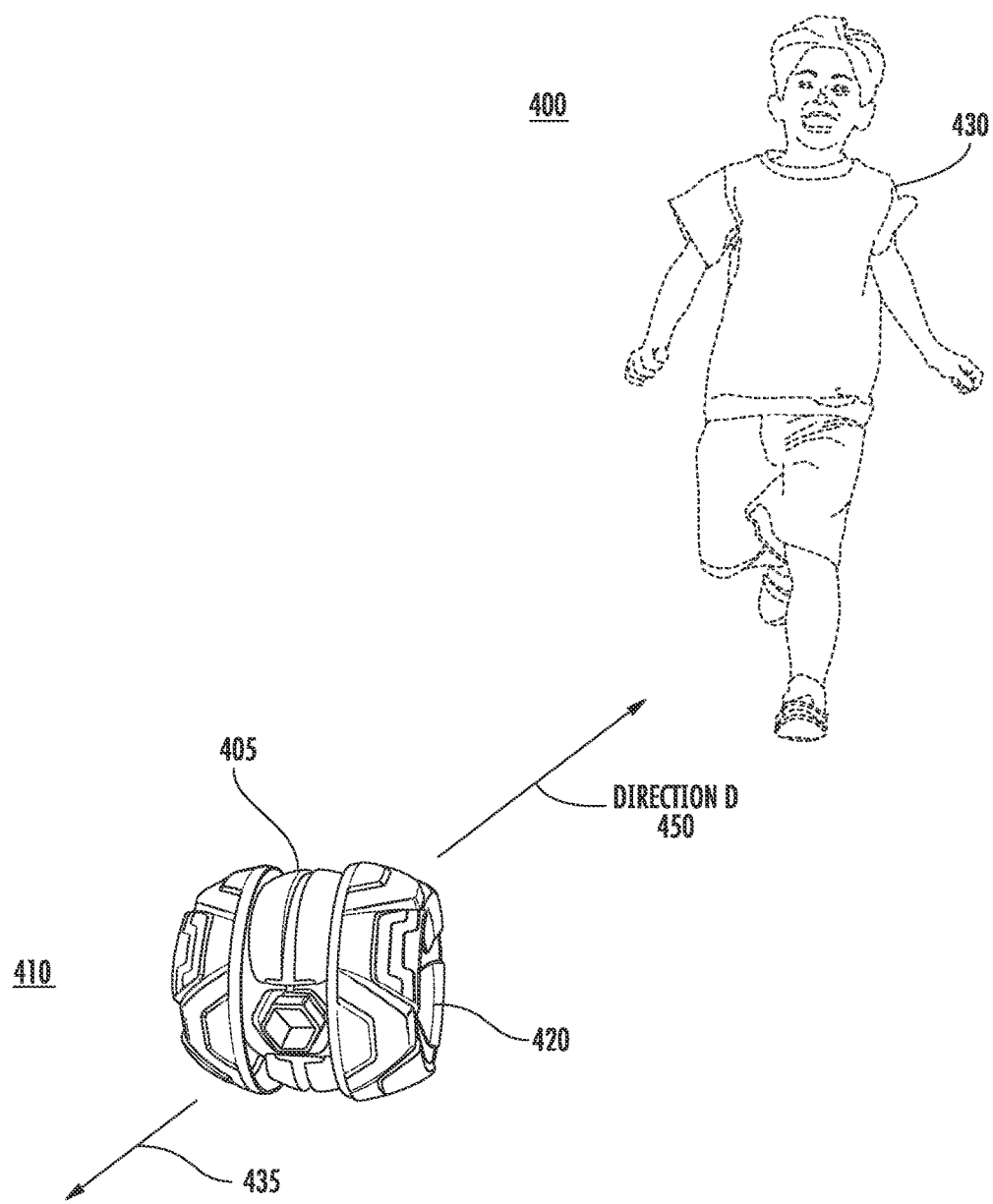
FIG. 4 illustrates an interaction between a user and an interactive turret robot, according to one embodiment described herein.

An example of this is shown in FIG. 4, which illustrates an interaction between a user and an interactive turret robot, according to one embodiment described herein. The illustration 400 includes an interactive turret robot 405 being pursued by a user 430 within a physical environment (e.g., the user's home). Here, the robot 405 is configured to stay a particular distance away from the user 430, and the robot 405 is currently moving away from the user 430 to maintain this distance, as the user 430 pursues the robot 405. The robot's 405 movement is depicted in the illustration 400 by the movement vector 435.

In the depicted embodiment, the robot 405 is also configured with microphone devices 410 and 420. The robot 405 could use such microphones 410 and 420 to determine the direction the user 430 is in, relative to the robot 405. This direction is depicted in the illustration 400 as the direction D 450. For example, the microphones could be used to detect a sound corresponding to the user. Here, the sound may be emitted directly by the user 405 (e.g., the sound of the user's footsteps, the user's voice, etc.), or the sound could be emitted by a device on the user's 405 person (e.g., another interactive device configured to emit an ultrasound signal). The microphones 410 and 420 could each detect the sound signals and logic for the robot 405 (which can reside on a control device remote from the robot 405) can compute a phase difference between the sound signals received by each of the microphones 410 and 420. The computed phase difference could then be used to determine the direction D 450. For example, if the logic for the robot 405 determines that the magnitude of the sound signal received from the microphone 420 is greater than the magnitude of the sound signal received from the microphone 410, the logic could determine that the direction D 450 is closer to the direction the microphone 420 is oriented in than the direction the microphone 410 is oriented in. In such an example, the magnitude of the phase difference could be used to determine how much closer the direction D 450 is to the direction the microphone 420 is oriented in.

Using the determined direction D 450, the robot 405 can be configured to interact with the user 430. For example, the user 430 could carry a blaster rifle toy and could wear a haptic feedback vest for use in playing a game of laser tag with the robot 405, where the first player (e.g., the user 430 or the robot 405) to score a certain number of "hits" on the opponent is the winner. Here, the haptic feedback vest could be configured to detect infrared signals coming from the robot's 405 blaster and to register these signals as "hits" by vibrating in response. Likewise, the blaster rifle toy could transmit infrared signals (e.g., when the user depresses a trigger on the blaster rifle toy) and the robot 405 could detect the incoming infrared signals as "hits" on the robot 405.

In such an example, the robot 405 could use the microphones 410 and 420 to determine the user's 430 orientation relative to the robot 405 (i.e., depicted by the direction D 450), and the robot 405 could then engage the motor to rotate the inner turret portion of the robot 405 such that the robot's 405 infrared blaster is facing the user (i.e., in the direction D 450). The robot 405 could then "fire" the infrared blaster by transmitting an infrared signal towards the user 430, thereby scoring a "hit" on the user's haptic vest. This process can continue until the game ends (e.g., when one user scores a predetermined number of hits on his opponent(s)).

In addition to "firing" at the user 430 using infrared signals, the robot 405 can be configured to move (e.g., by engaging an internal motor to turn the wheels) during the game of laser tag, in order make the game more challenging and enjoyable for the user 430. That is, by moving throughout the physical environment, 405 the robot becomes a more difficult target for the user 430. In doing so, the robot 405 can move behind barriers within the physical environment, thus forcing the user 430 to chase the robot 405 in order to have direct line-of-sight to the robot 405 and to score a "hit" on the robot using the user's 430 blaster rifle.

In controlling the movement of the robot 405, the movement logic (e.g., within the robot 405, within a remote controller device configured to direct the actions of the robot 405, etc.) could use the direction D 450. For instance, the direction D 450 could be used to direct the robot to move away from the user (e.g., movement 180 degrees from the direction D 450), to move towards the user (e.g., movement in the direction D 450), or to circle around the user (e.g., movement 90 degrees from the direction D 450). Doing so can provide a more enjoyable play experience for the user 430, as the robot 405 is aware of the user's 430 position and can react accordingly.

Figure 5:
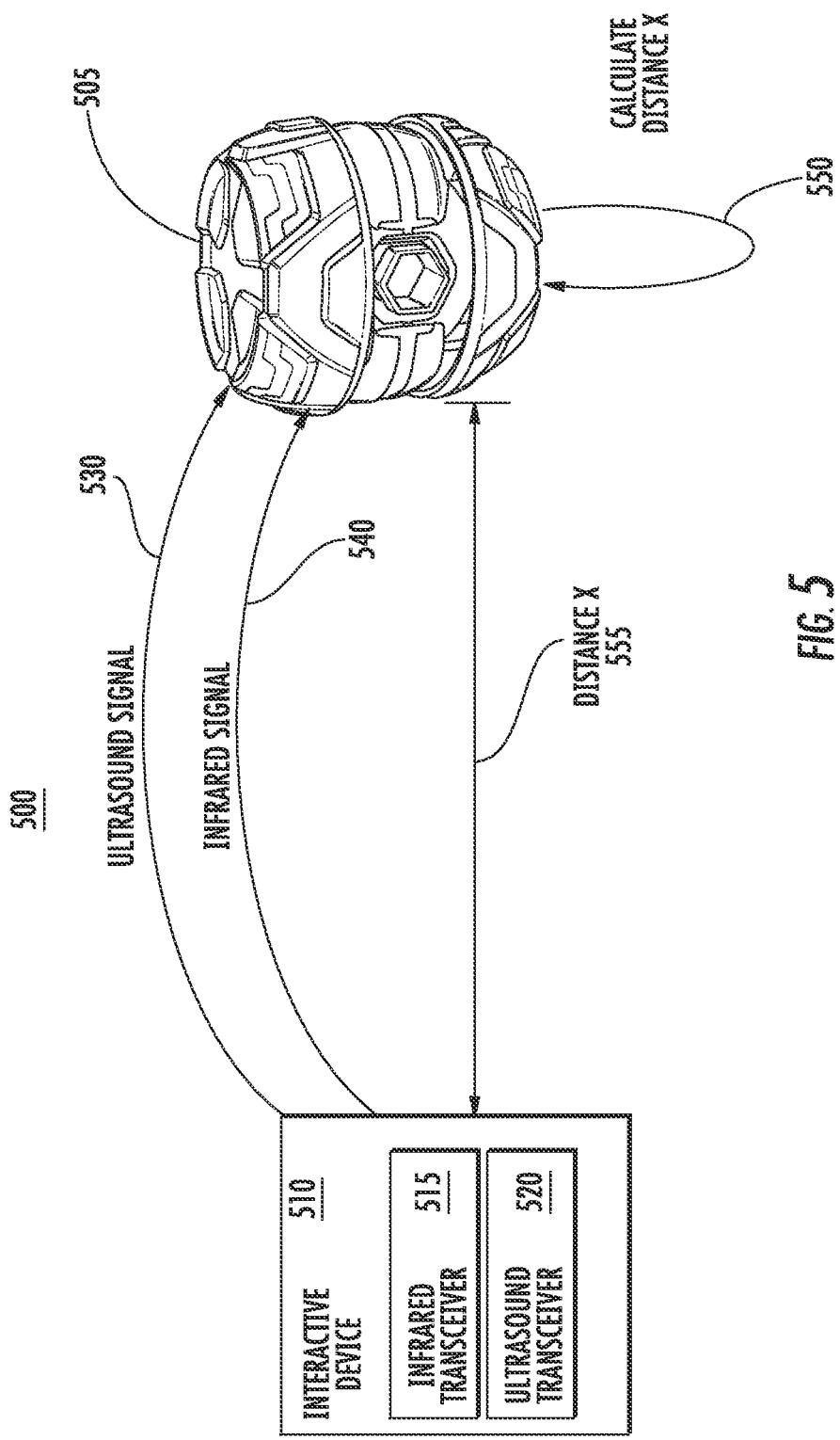
FIG. 5 illustrates an interaction between an interactive device and an interactive turret robot, according to one embodiment described herein.

In addition to determining the direction the user 430 (or, more generally, any other interactive device) is in, relative to the robot 405, the robot 405 can be configured to determine a measure of distance between the robot 405 and the user 430 (or again, more generally, any other interactive device). An example of such a determination is shown in FIG. 5, which illustrates an interaction between an interactive device and an interactive turret robot, according to one embodiment described herein. As shown, the diagram 500 includes an interactive device 510 and an interactive turret robot 505. The interactive device 510 includes an infrared transceiver 515 and an ultrasound transceiver 520. Although not shown, assume that the interactive turret robot 505 in this particular embodiment also includes an infrared transceiver and an ultrasound transceiver.

In order to determine the distance X 555 between the device 510 and the robot 505, the interactive device 510 can simultaneously transmit an ultrasound signal 530 (e.g., using the ultrasound transceiver 520) and an infrared signal 540 (e.g., using the ultrasound transceiver 515). The signals 530 and 540 could be transmitted, for example, responsive to a request transmitted from the robot 505 (or control logic for the robot 505) to the interactive device 510. Logic for the robot 505 could then determine the distance X 555 by measuring a time delay between the signals 530 and 540. Here, as infrared signals move faster than ultrasound signals, the time delay between when the two signals 530 and 540 are received will increase as the distance X 555 increases. Moreover, as neither the infrared signal 540 nor the ultrasound signal 530 are perceptible to users, the robot 505 can be configured to determine the distance X 555 without any awareness on the part of the user.

In one embodiment, the distance X 555 could be determined based on a received signal strength indicator (RSSI). For instance, the RSSI could correspond to a signal of an xBee module. As known, "xBee" is a brand name from Digi International of Minnetonka, Minn. for a family of form factor compatible radio modules operating according to, e.g., the IEEE 802.15.4 protocol. Here, the robot 505 could include an emitter and the interactive device 510 could determine that the distance between the robot 505 and the interactive device 510 is becoming greater, as the RSSI decreases as measured by a receiver in the interactive device 510. In other words, a determination could be made that RSSI decreases as the distance X 555 increases.

Once the distance X 555 is determined, the robot 505 can be configured to move based on the distance 555. For instance, the robot 505 could be configured to attempt to stay 3 meters away from a user at all times. As an example, the robot 505 could determine the distance 555 between the robot 505 and an interactive device on the user's person (e.g., a haptic feedback vest worn by the user, a blaster rifle toy carried by the user, etc.). If the robot 505 determines the distance 555 is less than 3 meters, the robot 505 could engage an internal motor to drive the robot's 505 wheels in such a way that the robot 505 moves away from the user (e.g., in a direction determined based on the direction D 450). Likewise, if the robot 505 determines the distance 555 is greater than 3 meters, the robot 505 could engage the internal engine to move towards the user (e.g., in a direction determined based on the direction D 450). Doing so provides a more enjoyable play experience for the user, as the robot 505 can dynamically determine and respond to the user's position relative to the robot 505.

Interactive Device Ecosystem

The interactive turret robot devices described herein can be configured to interact with or based on other interactive devices within the physical environment. Additionally, as discussed above, control logic for the interactive turret robots can reside within the robots themselves, or the robots can be controlled remotely by a controller device transmitting commands to the robot. For example, a controller device could detect a user has performed a particular action (e.g., performing a gesture to use the "Force" in a Star Wars® themed playtime environment) and, in response, the controller device could instruct the turret robot to move in a particular way based on the gesture. For example, if the user's gesture corresponds to a first "force power", the controller could instruct the robot to move in a direction specified by the gesture. As another example, if the user's gesture corresponds to a different "force power", the controller could instruct the robot to enter "berserk mode" and to begin wobbling on the floor until the user ceases the gesture.

Figure 6:
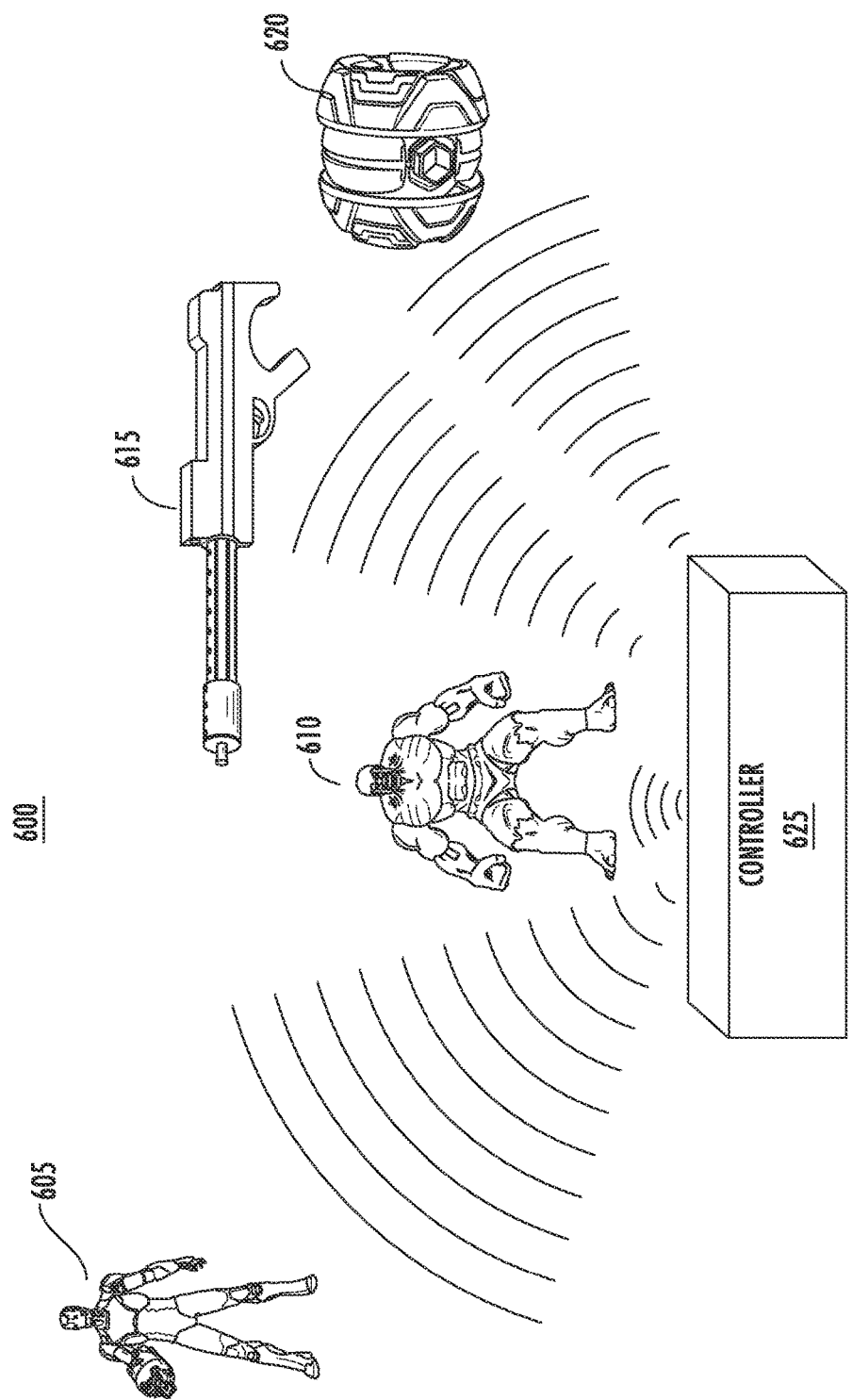
FIG. 6 illustrates an interaction between a controller device and a plurality of interactive devices, according to one embodiment described herein.

An example will now be discussed with respect to FIG. 6, which illustrates a playtime environment in which a controller is instructing interactive devices, according to one embodiment described herein. As shown, the system 600 includes an Iron Man® action FIG. 605, a Star Wars® blaster rifle 615, a Hulk® action FIG. 610, a turret robot 620 and a controller device 625. Here, the toys 605, 610, 615 and 620 may be capable of producing audiovisual effects (e.g., audio output, light effects, movement effects such as vibration, etc.). For example, each of the toys 605, 610, 615 and 620 can be capable of firing "blasts" by transmitting infrared signals and receiving "hits" by receiving an infrared signal.

However, while the toys 605, 610, 615 and 620 are capable of producing audiovisual effects, at least some of the toys 605, 610, 615 and 620 may not be configured with logic to determine when conditions in the physical environment indicate a particular effect should be performed. This may be due to, in part, the cost and complexity of configuring each toy 605, 610, 615 and 620 with the logic and hardware resources to detect stimuli in the physical environment and to perform a contextually appropriate audiovisual effect in response synchronously with other devices. As such, the toys 605, 610, 615 and 620 could be configured to receive commands (e.g., from controller 625) and to perform actions (e.g., audiovisual effects) responsive to the received commands. Doing so allows the toys 605, 610, 615 and 620 to be manufactured much more economically, while maintaining the capability to perform audiovisual effect(s) as part of a storytelling or playtime experience.

For example, as part of a Star Wars® storytelling experience, a storyline could indicate that devices within the physical environment should play a particular sound effect when the user performs a predefined gesture to use the "force." As such, the controller 625 could monitor the user's behavior to detect when the user has performed the predefined gesture. For example, the controller 625 could use one or more camera devices (e.g., within the controller devices 625, within one or more of the toys 605, 610, 615 and 620, etc.) to monitor the user's movement within the physical environment. As another example, the user could wear an article (e.g., a bracelet) configured with an accelerometer device and capable of reporting data describing the user's movement to the controller device 625.

Upon detecting the user has performed the predefined gesture, the controller 625 could broadcast a command to the toy devices 605, 610, 615 and 620, instructing the toy devices 605, 610, 615 and 620 to synchronously perform an audiovisual effect. Such a command could be broadcast, for example, via a radio-frequency transmitter, an infrared emitter, an ultrasound transmitter, and so on. More generally, any communications protocol may be used for the communication between the controller and the toy devices 605, 610, 615 and 620, consistent with the functionality described herein.

The toy devices 605, 610, 615 and 620 could then receive the command and could perform the specified audiovisual effect in synchrony. For example, in the event the command specifies to play a particular sound effect, each of the toy devices 605, 610, 615 and 620 could output the particular sound effect in synchrony with the other toy devices, thereby creating an improved sensorial experience for the user, relative to any of the toy devices 605, 610, 615 and 620 playing the sound effect individually. Here, the sound effect could be, e.g., a sampled sound effect or a function-generated sound effect. Moreover, by playing the sound effect synchronously with one another, the toy devices 605, 610, 615 and 620 can compensate for each other's weaknesses (e.g., a particular toy device being capable of outputting sounds within a limited frequency range), thereby producing an improved sound effect and sensorial immersion for the user.

In addition to synchronously performing audiovisual effects, the controller 625 may instruct the toy devices 605, 610, 615 and 620 to each perform different effects in unison or according to a determined schedule. For instance, the controller 625 could create the illusion of a moving sound by scheduling each of the toy devices 605, 610, 615 and 620 to play a sound effect according to a determined schedule or to play sound effects in unison that give the appearance of a moving sound. As an example, the controller 625 broadcast commands to create a panning effect in which the amplitude, spectral content (e.g., Doppler effects), and phase of sounds emerging from differing toy devices 605, 610, 615 and 620 are adjusted to localize sounds in a dynamic trajectory among the different toys. Here, the controller 625 could move the localized sounds through the physical environment to simulate the user shooting the blaster rifle 115 and the blaster beam moving from one toy device to the next until ultimately reaching its target. Doing so provides a more realistic experience for the user, particularly compared to only the blaster device 615 outputting a sound effect indicating the blaster has been fired.

As discussed above, in addition to synchronously playing sound effects, the toy devices 605, 610, 615 and 620 may be configured to reinforce these acoustical effects with other audiovisual effects such as simultaneous light effects and physical motions. For example, the controller 625 could broadcast a command(s) instructing the toy devices 605, 610, 615 and 620 to perform respective movements (e.g., activating a light-emitting device within the respective toy device) according to a determined schedule, in order to produce a phi phenomenon optical illusion in which the user perceives continuous motion between the toy devices. Such an effect could be coupled with the movement of the sound effect produced through dynamic variations in the phase, intensity and spectral content of the sounds played by the different toy devices 605, 610, 615 and 620. In addition to the sound and movement emanating from a source to a destination, the controller 625 could broadcast commands creating the illusion of an object (e.g., a virtual blast fired from the toy blaster device 615) hitting the target and then ricocheting off of the target in a determined direction. Doing so produces a much more powerful illusion of the user actually firing the blaster device 615, thereby improving the playtime experience.

In instructing the toys 605, 610, 615 and 620, the controller 625 could broadcast infrared signals to one of the toys 605, 610, 615 and 620 to trigger discrete audiovisual effects (e.g., discrete expressions of movement, sound, light etc.). Additionally, in one embodiment, a more sophisticated toy device (e.g., the blaster rifle 615) can transmit instructions to directly control another one of the toy devices 605, 610 and 620, in order to render a complex sequence of behaviors via a stream of infrared commands. In one embodiment, the controller 625 employs an infrared protocol that uses a high brightness (e.g., around 100 mW at 940 nm) infrared light-emitting diodes (LEDs) to propagate carrier modulated signals (e.g., at 38 kHz) to TSOP infrared receivers in target devices (e.g., another action disc device 200). Such a protocol can allow unicast, broadcast and multicast modes for controlling individual toys (or action discs) or multiple toys (or action discs) in sequence or synchrony. Doing so allows toys 605, 610, 615 and 620 to appear to behave intelligently (e.g., in response to physical stimuli, in response to a context of a story, etc.), even though the logic providing the intelligence for the toys 605, 610, 615 and 620 resides elsewhere (e.g., controller 625).

For instance, in one embodiment, more sophisticated toys or the controller device 625 can direct the actions of the action discs via transmitted infrared signals, in order to control the emission of sound, light, and motion from another one of the interactive devices. Additionally, such infrared signals can trigger scripts or macros stored within program memory or firmware within the other interactive devices, causing the respective interactive device to perform a sequence of audiovisual effects. Moreover, such infrared signals can even be used to communicate in the absence of line-of-sight between the more sophisticated toy (or controller 625) and the interactive toy device, through the use of high power output and sensitive infrared receivers.

As an example, a user could hold the blaster rifle toy 615 and could play a game of laser tag with the toy devices 605, 610 and 620. Additionally, although not shown, the user could wear a haptic feedback vest interactive device capable of receiving infrared signals that can indicate "hits" scored on the user by one of the devices 605, 610 and 620. During the game, the actions of the devices 605, 610 and 620 can be directed by the controller 625. For example, the controller 625 could maintain a state for each of the toys 605, 610 and 620 that specifies the toy's current status in the current game of laser tag. Such status information could include, e.g., how many hits the toy has received, how many hits on other interactive devices the toy has scored, and so on.

As discussed above, the controller 625 could use a microphone and an infrared receiver within the turret robot 620 to determine a distance between the robot 620 and another interactive device (e.g., the blaster rifle 615). That is, the robot 620 could receive an infrared signal and an ultrasound signal from the blaster rifle 615, where the two signals were transmitted by the rifle 615 simultaneously. The controller 625 could then calculate a time difference between when the two signals were received by the robot 620, and could calculate the distance between the robot 620 and the rifle 615 based on this distance. Of note, such a distance could also be calculated based on infrared and ultrasound signals transmitted simultaneously by the robot 620 and received at different times by the blaster rifle 615. The controller 625 could then direct the movement of the robot 620 based on the determined distance. For example, the controller 625 could cause the robot 620 to move in such a way that maintains a predefined distance between the robot 620 and the rifle 615. Doing so can in turn cause the robot 620 to maintain the predefined distance from a user as well, when the blaster rifle 615 is held by the user.

Additionally, the robot 620 could determine the direction of another interactive device, relative to the robot 620, using microphones within the robot 620. For example, the robot 620 could receive sound signals corresponding to the blaster rifle 615 using two or more microphones within the robot 620, and the controller 625 could compute a phase difference between the sound signals. The controller 625 could then determine the direction of the blaster rifle 615, relative to the robot 620, based on the phase difference and the orientation of the microphones on the robot 620. Such a distance could then be used, for example, to instruct the robot 620 to move towards or away from the blaster rifle 615.

The robot 620 may also be configured with deployable tentacle accessories that can be used to physically impact the other interactive devices 605 and 610. For instance, the robot 620 could enter "turret mode" within a certain distance of the action FIG. 605 (e.g., calculated based on the receipt times of two signals simultaneously transmitted by the action FIG. 605 and travelling at distinct, known speeds). Upon entering "turret mode", the robot 620 could deploy the tentacle accessories and could engage an internal motor, causing the turret portion 140 of the robot 620 to rotate rapidly. In turn, such a rotation could cause the tentacle accessories to slap into the action FIG. 605, potentially knocking the action FIG. 605 over. In one embodiment, the controller 625 could detect such a physical hit on the action FIG. 605 (e.g., using an accelerometer within the action FIG. 605 and/or the robot 620) and could update the maintained state of the action FIG. 605 accordingly.

Technical Description

Figure 7:
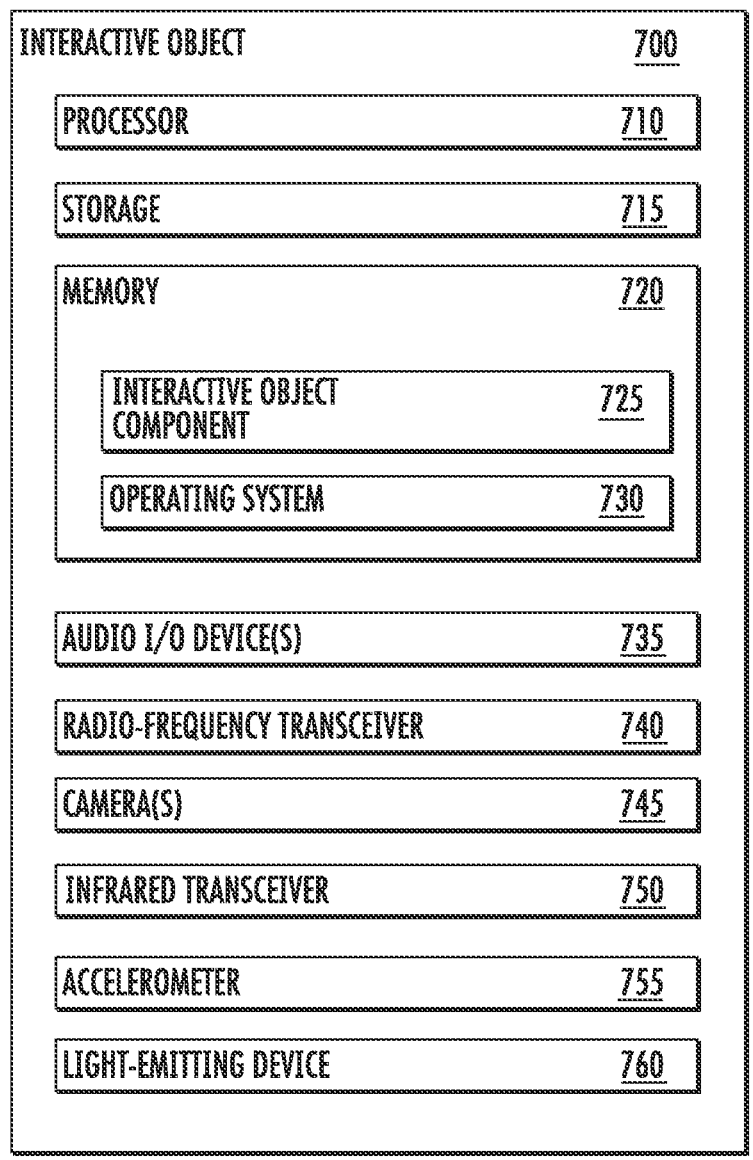
FIG. 7 is a block diagram illustrating an interactive device configured with an interactive device component, according to one embodiment described herein.

An example of an interactive device is shown in FIG. 7, which is a block diagram illustrating an interactive device configured with an interactive object component, according to one embodiment described herein. In this example, the device 700 includes, without limitation, a processor 710, storage 715, memory 720, audio input/output (I/O) device(s) 735, a radio-frequency (RF) transceiver 740, a camera device(s) 745, an infrared transceiver 750, an accelerometer device 755, and a light-emitting device 760. For instance, the interactive device 700 could represent the interactive turret robot device (e.g., device 620) discussed above.

Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. The radio-frequency transceiver 740 enables the interactive object component 725 to connect to a data communications network (e.g., wired Ethernet connection or an 802.11 wireless network).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 7, the memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the interactive device 700. Illustratively, the memory 720 includes an interactive object component 725 and an operating system 730. The interactive object component 725 could be configured to receive commands (e.g., encoded in RF or infrared signals) and to execute the commands to perform audiovisual effects. In one embodiment, the interactive object component 725 is configured to decrypt the commands using a received key before executing the commands. The operating system 730 generally controls the execution of application programs on the interactive device 700. Examples of operating system 730 include UNIX, a version of the Microsoft Windows® operating system, and distributions of the Linux® operating system. Additional examples of operating system 730 include custom operating systems for gaming consoles, including the custom operating systems for systems such as the Nintendo DS® and Sony PSP®.

The infrared transceiver 750 represents any device capable of sending and receiving infrared signals. In another embodiment, a device 700 that only sends or receives infrared signals may be configured with an infrared transmitter or a infrared receiver, respectively, as opposed to the infrared transceiver 750. The sound I/O devices 735 could include devices such as microphones and speakers. For example, the speakers could be used to produce sound effects (e.g., explosion sound effects, dialogue, etc.) and/or to produce vibration effects.

Generally, the interactive object component 725 provides logic for the interactive device 700. For example, the interactive object component 725 could be configured to detect that a coded infrared signal has been received (e.g., using the infrared transceiver 750). The interactive object component 725 could then determine a type of the infrared signal (e.g., based on data specified within the coded infrared signal) and could determine a corresponding response based on determined type. For example, the interactive object component 725 could determine that the infrared signal specifies that a repulsor ray blast sound effect should be played, and, in response, could output the specified sound effect using audio I/O devices 735. As another example, the signal could be encoded with data specifying that a particular lighting effect should be displayed according to a specified schedule (e.g., at a particular point in time), and the interactive object component 725 could monitor the schedule (e.g., using an internal clock) and could activate the appropriate light-emitting device 760 at the appropriate time. In one embodiment, the interactive object component 725 maintains all logic necessary to interact with other interactive devices and users without relying on instructions from a controller device.

Figure 8:
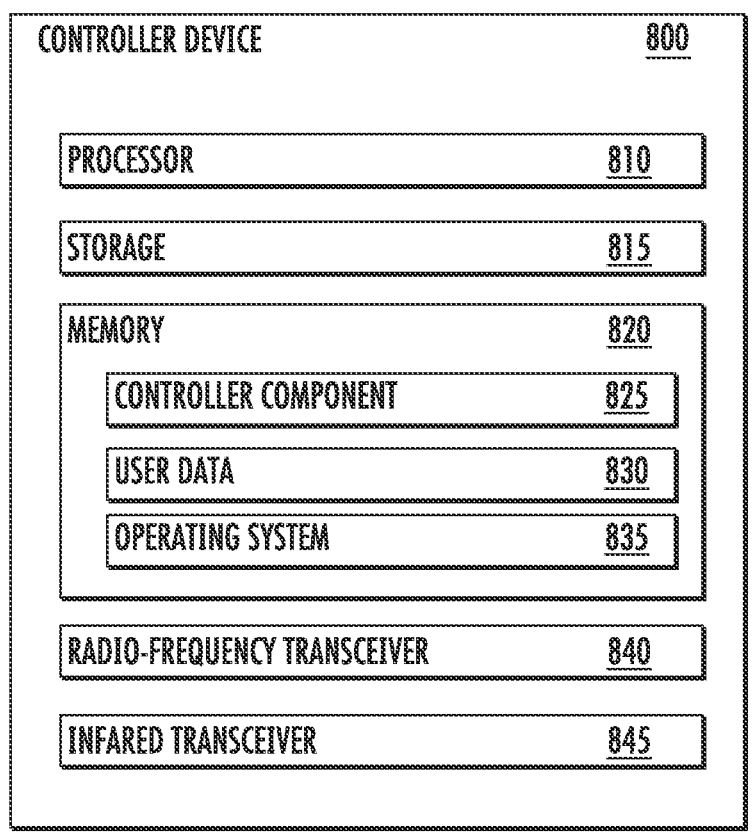
FIG. 8 is a block diagram illustrating a controller device configured with a controller component, according to one embodiment described herein.

FIG. 8 illustrates an example of a controller device, according to one embodiment described herein. As shown, the controller 800 includes a processor 810, storage 815, memory 820, a radio-frequency transceiver 840 and an infrared transceiver 845. Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. The radio-frequency transceiver 840 enables the controller device 800 to transmit and receive radio-frequency signals. Likewise, the infrared transceiver 845 allows the device 800 to transmit and receive infrared signals. Further, while the depicted embodiment illustrates the components of a particular controller device 800, one of ordinary skill in the art will recognize that interactive objects may use a variety of different hardware architectures. Moreover, it is explicitly contemplated that embodiments may be implemented using any device or computer system capable of performing the functions described herein.

The memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the controller device 800. Illustratively, the memory 820 includes a controller component 825, user data 830 and an operating system 835. The operating system 835 generally controls the execution of application programs on the controller device 800. Examples of operating system 835 include UNIX, a version of the Microsoft Windows® operating system, and distributions of the Linux® operating system. Additional examples of operating system 835 include custom operating systems for gaming consoles, including the custom operating systems for systems such as the Nintendo DS® and Sony PSP®.

Generally, the controller component 825 configures the interactive objects (e.g., toys 110, 115 and 120, or an action disc device 200) to perform particular actions. The particular actions can also be based on the user data 830 (e.g., historical interactions data between the user and various interactive objects, user preferences data, etc.) and one or more environmental factor (e.g., a room of the house the object is currently in, a time of day, a day of the week, etc.). For instance, in one embodiment, the controller component 825 is configured with logic for recognizing particular events and broadcasting commands for the devices to perform a corresponding action(s) in response. In such an embodiment, the controller component 825 could use input/output devices (e.g., cameras, microphones, wireless transceivers, infrared sensors, etc.) to detect when a particular event occurs. For instance, the controller component 825 could use a camera to detect when a particular projection appears, and could then broadcast a command (e.g., using a RF signal) instructing the devices to perform a corresponding action in response. As another example, the controller component 825 could receive a wireless signal (e.g., an RF signal, data communicated using Bluetooth communications, etc.) from another one of the devices, indicating that a particular action has been performed. The device could then broadcast a signal instructing one or more other devices to perform a corresponding action responsive to receiving the signal.

In a particular embodiment, the controller component 825 is configured to control the actions of multiple devices to cause the devices to perform audiovisual effects synchronously. For instance, the controller component 825 could broadcast a message to the devices, instructing the devices to perform a particular audiovisual effect immediately upon receiving the message. As another example, the controller component 825 could broadcast a message to the devices, instructing the devices to perform actions (e.g., play a sound effect, trigger a lighting effect, etc.) according to a schedule. Here, the devices may maintain internal clocks that are synchronized with one another for use in synchronously performing the audiovisual actions.

Generally speaking, the devices and the controller 800 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An apparatus, comprising:
   a plurality of wheels configured to rotate in either of two rotational directions about an axis of rotation;
   a turret portion disposed between the two wheels and rotatable about the axis of rotation in either of the two rotational directions and independently of the plurality of wheels; and
   at least one motor configured to provide torque to the plurality of wheels and the turret portion, wherein the at least one motor can cause each of the plurality of wheels to rotate independently in either of the two rotational directions when operating in a first rotational speed mode, and wherein the at least one motor can cause the turret portion to rotate in either of the two rotational directions independently of the plurality of wheels when operating in a second rotational speed mode which is faster relative to the first rotational speed mode.

2. The apparatus of claim 1, wherein the turret portion has mass unequally distributed about the axis of rotation.

3. The apparatus of claim 1, wherein the turret portion includes an infrared emitter device capable of emitting infrared signals in a target direction.

4. The apparatus of claim 1, wherein each of the plurality of wheels contains a flat side surface such that the apparatus can sit upright on the flat side surface.

5. The apparatus of claim 4, wherein an edge of each of the plurality of wheels is semi-rounded.

6. The apparatus of claim 4, further comprising:
   a sensor configured to detect when the apparatus is sitting upright on one of the flat side surfaces of one of the plurality of wheels; and
   logic configured to engage the at least one motor in the second rotational speed mode to cause the turret portion of the apparatus to rotate, until the sensor detects that the apparatus is sitting upright on one of the flat side surfaces.

7. The apparatus of claim 4, further comprising:
   a sensor configured to detect when the apparatus is sitting upright on one of the flat side surfaces of one of the plurality of wheels; and
   logic configured to engage the at least one motor in the second rotational speed mode to cause the turret portion of the apparatus to rotate, until the sensor detects that the apparatus is not sitting upright on one of the flat side surfaces.

8. The apparatus of claim 1, further comprising:
   one or more tentacle attachments connected to each of the plurality of wheels.

9. The apparatus of claim 8, wherein the one or more tentacle attachments are retractable to an inner portion of the apparatus.

10. The apparatus of claim 9, wherein each of the two wheels contains a flat side surface such that the apparatus can sit upright on the flat side surface, and further comprising:
    a sensor configured to detect when the apparatus is sitting upright on one of the flat side surfaces of one of the plurality of wheels; and
    logic configured to, upon detecting that the apparatus is sitting upright on one of the flat side surfaces:
      deploy one of the retracted one or more tentacle attachments; and
      engage the at least one motor in the second rotational speed mode to cause the turret portion of the apparatus to rotate, thereby causing the deployed one or more tentacle attachments to rotate.

11. The apparatus of claim 10, further comprising:
    logic configured to, upon detecting that the apparatus is not sitting upright on one of the flat side surfaces, retract the one or more tentacle attachments.

12. The apparatus of claim 1, further comprising:
    an infrared transceiver;
    an ultrasound transceiver; and
    logic configured to determine a distance between the apparatus and second apparatus, comprising:
      receiving an infrared signal using the infrared transceiver at a first moment in time;
      receiving an ultrasound signal using the ultrasound transceiver at a second moment in time, wherein the infrared signal and the ultrasound signal were transmitted by the second device at substantially the same time;

calculating a time lapse value between the first moment in time and the second moment in time; and determining the distance between the apparatus and the second apparatus based on the calculated time lapse value.

13. The apparatus of claim 11, wherein determining the distance between the apparatus and the second apparatus is further based on a speed at which infrared signals travel and a speed at which ultrasound signals travel.

14. A method, comprising:

receiving, at a first apparatus and at a first moment in time, an infrared signal using an infrared transceiver;

receiving, at the first apparatus and at a second moment in time, an ultrasound signal using an ultrasound transceiver, wherein the infrared signal and the ultrasound signal were transmitted from a second device at substantially the same time;

calculating a time lapse value between the first moment in time and the second moment in time; and determining the distance between the first apparatus and the second apparatus based on the calculated time lapse value.

15. The method of claim 14, wherein determining the distance between the apparatus and the second apparatus is further based on a speed at which infrared signals travel and a speed at which ultrasound signals travel.

16. An apparatus, comprising:

two wheels configured to rotate in either of two rotational directions about an axis of rotation, wherein each of the two wheels contains a flat side surface such that the apparatus can sit upright on the flat side surface;

a turret portion disposed between the two wheels and rotatable about the axis of rotation in either of the two rotational directions and independently of the two wheels, wherein the turret portion has mass unequally distributed about the axis of rotation;

a sensor configured to detect when the apparatus is sitting upright on one of the flat side surfaces of one of the two wheels;

at least one motor configured to provide torque to the two wheels and the turret portion, wherein the at least one motor can cause each of the two wheels to rotate independently in either of the two rotational directions when operating in a first rotational speed mode, and wherein the at least one motor can cause the turret portion to rotate in either of the two rotational directions independently of the two wheels when operating in a second rotational speed mode which is faster relative to the first rotational speed mode; and logic configured to transition between a first state in which the apparatus is sitting upright on one of the flat side surfaces of one of the two wheels and a second state in which the apparatus is not sitting upright by engaging the at least one motor in the second rotational speed mode to cause the turret portion of the apparatus to rotate, until detecting that the transition is complete based on a change in a reading from the sensor.

17. The apparatus of claim 16, further comprising:

an infrared transceiver;

an ultrasound transceiver; and logic configured to determine a distance between the apparatus and second apparatus, comprising:

receiving an infrared signal using the infrared transceiver at a first moment in time;

receiving an ultrasound signal using the ultrasound transceiver at a second moment in time, wherein the infrared signal and the ultrasound signal were transmitted by the second device at substantially the same time;

calculating a time lapse value between the first moment in time and the second moment in time; and determining the distance between the apparatus and the second apparatus based on the calculated time lapse value.

18. The apparatus of claim 17, wherein determining the distance between the apparatus and the second apparatus is further based on a speed at which infrared signals travel and a speed at which ultrasound signals travel.

19. The apparatus of claim 16, further comprising:

one or more tentacle attachments connected to each of the two wheels, wherein the one or more tentacle attachments are retractable to an inner portion of the apparatus.

20. The apparatus of claim 19, further comprising:

logic configured to, upon detecting that the apparatus is sitting upright on one of the flat side surfaces:

deploy one of the retracted one or more tentacle attachments; and engage the at least one motor in the second rotational speed mode to cause the turret portion of the apparatus to rotate, thereby causing the deployed one or more tentacle attachments to rotate.

\* \* \* \* \*

UNITED STATES PATENT AND TRADEMARK OFFICE
CERTIFICATE OF CORRECTION

PATENT NO. : 9,927,235 B2  
APPLICATION NO. : 14/560984  
DATED : March 27, 2018  
INVENTOR(S) : Haseltine et al.

Page 1 of 1

It is certified that error appears in the above-identified patent and that said Letters Patent is hereby corrected as shown below:

In the Drawings

On sheet 9 of 9, in Figure 8, reference numeral 845, Line 1, delete "INFARED" and insert -- INFRARED --, therefor.

In the Specification

In Column 7, Line 50, delete "FIG." and insert -- figure --, therefor.

In Column 7, Line 51, delete "FIG." and insert -- figure --, therefor.

In Column 10, Line 45, delete "FIG." and insert -- figure --, therefor.

In Column 10, Line 47, delete "FIG." and insert -- figure --, therefor.

In Column 10, Line 52, delete "FIG." and insert -- figure --, therefor.

In Column 10, Line 53, delete "FIG." and insert -- figure --, therefor.

In Column 10, Line 55, delete "FIG. 605" and insert -- figure 605 --, therefor.

In Column 10, Line 55, delete "FIG." and insert -- figure --, therefor.

In Column 10, Line 57, delete "FIG." and insert -- figure --, therefor.

Signed and Sealed this  
Tenth Day of July, 2018

Andrei Iancu  
*Director of the United States Patent and Trademark Office*